(12) United States Patent
Greenzeiger et al.

(10) Patent No.: US 11,403,673 B2
(45) Date of Patent: Aug. 2, 2022

(54) VALUATION OF INVITATIONAL CONTENT SLOTS BASED ON USER ATTENTIVENESS

(71) Applicant: Apple Inc., Cupertino, CA (US)

(72) Inventors: Michael Froimowitz Greenzeiger, Sunnyvale, CA (US); Mehul K. Sanghavi, Sunnyvale, CA (US); Ravindra M. Phulari, San Jose, CA (US)

(73) Assignee: Apple Inc., Cupertino, CA (US)

( * ) Notice: Subject to any disclaimer, the term of this patent is extended or adjusted under 35 U.S.C. 154(b) by 1490 days.

(21) Appl. No.: 14/180,191

(22) Filed: Feb. 13, 2014

(65) Prior Publication Data

US 2015/0227979 A1 Aug. 13, 2015

(51) Int. Cl.
*G06Q 30/00* (2012.01)
*G06Q 30/02* (2012.01)

(52) U.S. Cl.
CPC ..... *G06Q 30/0269* (2013.01); *G06Q 30/0242* (2013.01); *G06Q 30/0273* (2013.01)

(58) Field of Classification Search
None
See application file for complete search history.

(56) References Cited

U.S. PATENT DOCUMENTS

| | | | | |
|---|---|---|---|---|
| 8,914,500 | B1 * | 12/2014 | Liu | G06Q 30/0269 709/223 |
| 2009/0083631 | A1 * | 3/2009 | Sidi | G06Q 30/02 715/721 |
| 2009/0094092 | A1 | 4/2009 | Hengel | |
| 2010/0042421 | A1 | 2/2010 | Bai et al. | |
| 2010/0057639 | A1 * | 3/2010 | Schwarz | G06Q 30/00 705/400 |
| 2012/0158502 | A1 * | 6/2012 | Chung | G06Q 30/0255 705/14.53 |
| 2012/0158520 | A1 | 6/2012 | Momeyer et al. | |
| 2013/0246180 | A1 | 9/2013 | Steelberg et al. | |
| 2013/0298044 | A1 | 11/2013 | Bill | |
| 2015/0142557 | A1 * | 5/2015 | Krishnamurthy | G06Q 30/0241 705/14.45 |
| 2015/0154631 | A1 * | 6/2015 | Umeda | G06Q 30/0243 705/14.42 |

OTHER PUBLICATIONS

Gibs, Jon, Does online advertising deliver the target audience, Oct. 6, 2009, https://www.nielsen.com/us/en/insights/article/2009/does-online-advertising-deliver-the-target-audience/ (Year: 2009).*
Yuan et al., Real-time Bidding for Online Advertising: Measurement and Analysis, 2013, ADKDD '13 workshop (Year: 2013).*

* cited by examiner

*Primary Examiner* — Michael W Schmucker
(74) *Attorney, Agent, or Firm* — Polsinelli LLP

(57) ABSTRACT

Methods and arrangements are provided to valuate advertising slots for a client device based on events that are detected on the device. The cost of the advertising slots can vary according to the timing of the user interactions or according to different classifications for the client device that are determined based on the events. The cost of the advertising slot can be determined before or after the invitational content is provided to the client device.

25 Claims, 7 Drawing Sheets

200

300

500

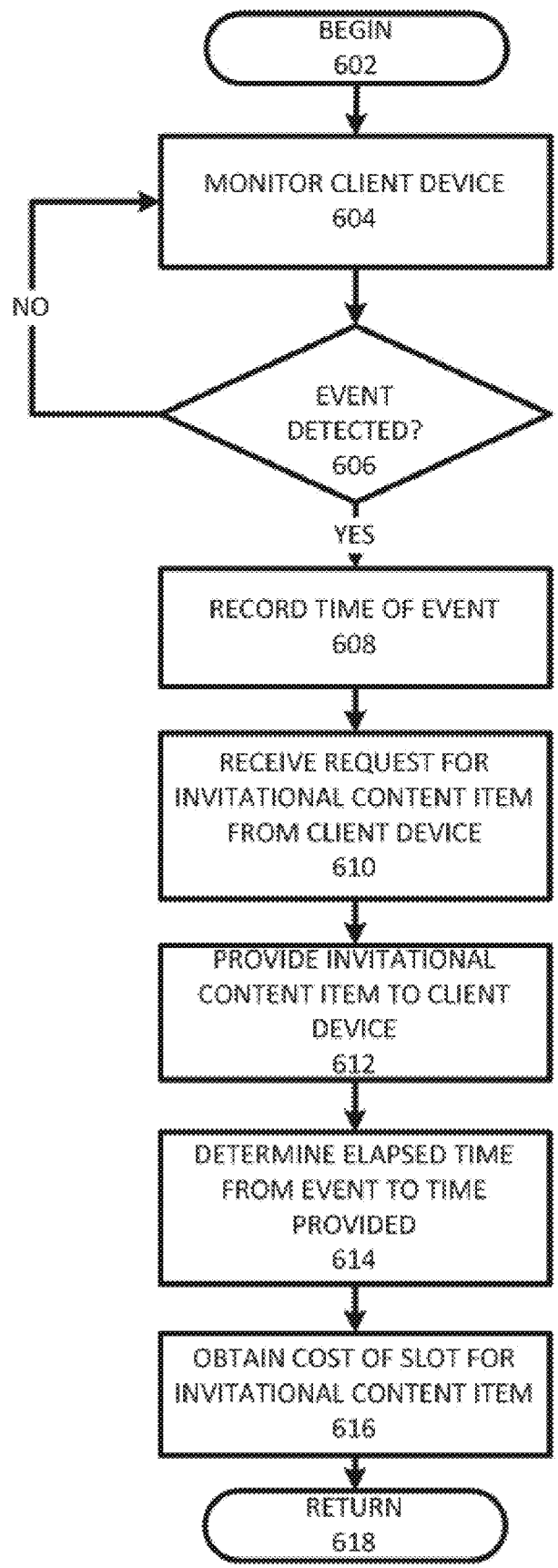

VALUATION OF INVITATIONAL CONTENT SLOTS BASED ON USER ATTENTIVENESS

TECHNICAL FIELD

The present technology pertains to valuing invitational content slots according to the attentiveness of the device user, based on events detected on a client device.

BACKGROUND

Online advertising is widely used by advertisers to market their products via electronic devices such as mobile phones, tablets, personal computers, or any other network enabled computing device. Given the widespread availability of these types of electronic devices, online advertising can be an extremely effective way for advertisers to reach a wide mass of potential customers and induce numerous users to purchase their products. By targeting users with effective online advertisements, advertisers can yield large financial returns from their advertisements. Not surprisingly, many advertisers place a premium value on advertising space that is more likely to reach their target audience.

The value of an online advertising slot is determined in a number of ways. For example, the slot's valuation will vary depending on the targeted demographics such as age, income, gender, ethnicity, level of education, occupation, etc. In addition, the valuation will also vary by geographic region and time of delivery. However, while an advertisement may be tailored for and delivered to a particular audience, its value is minimal if the user is not engaged with the electronic device when it is delivered. In general, an online advertisement will be delivered to an electronic device without any knowledge of the user's present attentiveness to the device. Consequently, many such advertisements are delivered to an electronic device but are never actually seen or heard by the user because the user was not actively engaged with the device or was otherwise preoccupied at the time of delivery.

SUMMARY

Additional features and advantages of the disclosure will be set forth in the description that follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

The approaches set forth herein can be used to valuate advertising time slots based on the likelihood that it will be viewed by the device user. This can be gauged by monitoring the device for events and keeping track of the time and the types of events to determine the receptiveness of the device user. Disclosed are systems, methods, and non-transitory computer-readable storage media for creating and processing the present technology.

One aspect of the present technology involves detecting an event on a device that has an open advertising slot. The event can be used to assign a classification to the device and the classification can be used to determine the cost for the open advertising slot on the device. Accordingly, an advertising item is provided to the device for the open slot.

The device classification can be based on a number of factors. For example, the device can be classified based on the amount of time from the detected event. Alternatively, the classification can be based on user interactions that are further defined as either positive or negative events. A positive event type would result in a higher cost for the open ad slot. The present technology can also detect an event defined as the lack of a user interaction. These events can be associated with applications running on the user device, such as a music playing application.

Another aspect of the present technology involves detecting an event on a device that has an open advertising slot and then identifying various cost windows based on the detected event. The present technology will identify at least two cost windows, each having different costs associated with the delivery of an advertisement. After the open advertising slot is filled, the cost of the slot may be obtained as per the identified cost windows according to the time the slot was actually filled.

Alternatively, the cost of the advertising slot can be obtained prior to providing the advertisement to the device. This allows the present technology to select the particular advertisement to provide for the open slot based on the predetermined slot cost.

The cost windows can be defined in a number of different ways. In one example, the first cost window can have a fixed time duration that commences upon the detection of the event. Alternatively, the first cost window can be defined according to the average amount of time between the detected events. In one embodiment, the first cost window can be associated with a higher delivery cost for the open slot than the second cost window.

Another aspect of the present technology involves recording the time when the event is detected and when the advertising is subsequently provided to the device. The cost for the slot can be obtained based on the time that has elapsed between the two. For example, the cost for the slot can decrease as the time elapsed since the event increases. The cost can be modified further based on a classification for the event type that was detected.

Another aspect of the present technology involves using the detected event to determine a mood classification for the client device. The mood classification can be used to further adjust the cost of the open advertising slot. For example, the mood classification can be a positive mood or a negative mood, according to the detected event. If the device is classified as having a positive mood, then the cost for the open advertising slot can be adjusted upward. Likewise, if the device is classified as having a negative mood, this can result in the cost of the slot being adjusted downward.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIG. 6 illustrates an exemplary method embodiment;

DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The disclosed technology addresses the need in the art for an efficient means to value online advertisement slots based on the attentiveness of the target audience. Advertisers will place a premium on a slot that delivers content when a user is attentive and therefore most likely to be receptive to the advertisement. In particular, the present technology is directed to systems, methods, devices, and non-transitory computer-readable storage media providing valuation for the advertising slot based on user attentiveness.

Prior to discussing the present technology in detail, a brief introductory description of an exemplary configuration of devices and a network is disclosed herein. A detailed description of the various aspects of the present technology will then follow. These variations shall be described herein as the various embodiments are set forth.

Figure 1:
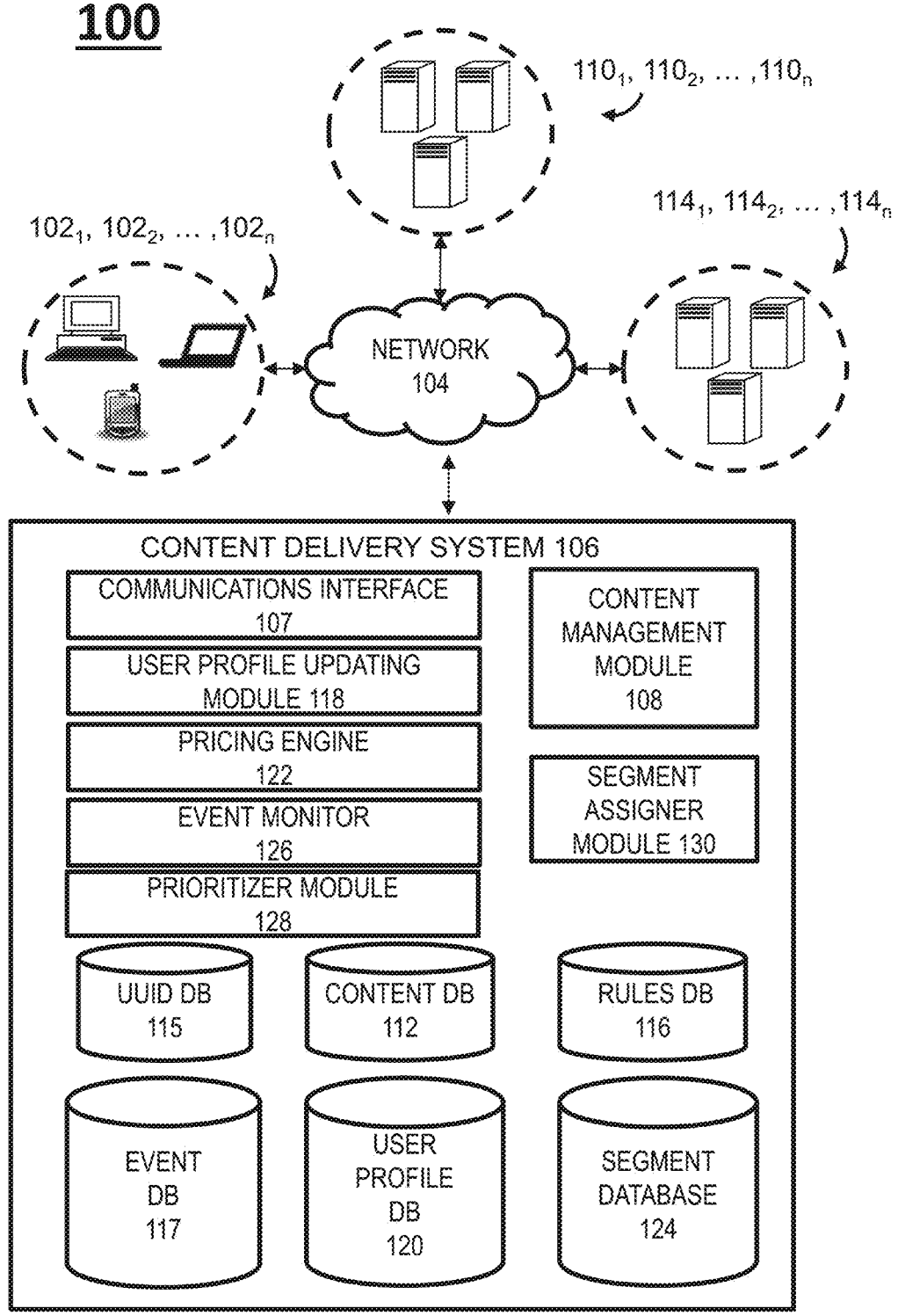
FIG. 1 illustrates an exemplary configuration of devices and a network.

An exemplary system configuration 100 is illustrated in FIG. 1, wherein electronic devices communicate via a network for purposes of exchanging content and other data. The system can be configured for use on a wide area network such as that illustrated in FIG. 1. However, the present principles are applicable to a wide variety of network configurations that facilitate the intercommunication of electronic devices. For example, each of the components of system 100 in FIG. 1 can be implemented in a localized or distributed fashion in a network.

In system 100, invitational content can be delivered to user terminals $102_1$, $102_2$, ..., $102_n$ (collectively "102") connected to a network 104 by direct and/or indirect communications with a content delivery system 106. User terminals 102 can be any network enabled client devices, such as desktop computers; mobile computers; handheld communications devices, e.g. mobile phones, smart phones, tablets; smart televisions; set-top boxes; and/or any other network enabled computing devices. Furthermore, content delivery system 106 can concurrently accept connections from and interact with multiple user terminals 102.

The content delivery system 106 can receive a request for electronic content, such as a web page, an application, a media item, etc., from one of user terminals 102. Thereafter, the content delivery system 106 can assemble a content package and transmit the assembled content page to the requesting one of user terminals 102. To facilitate communications with the user terminals 102 and/or any other device or component, the content delivery system 106 can include a communications interface 107.

The content delivery system 106 can include a content management module 108 to facilitate the generation of an assembled content package. Specifically, the content management module 108 can combine content from one or more primary content providers $110_1$, $110_2$, ..., $110_n$ (collectively "110") and content from one or more secondary content providers $114_1$, $114_2$, ... $114_n$ (collectively "114") to generate the assembled content package for the user terminals 102. For example, in the case of a web page being delivered to a requesting one of user terminals 102, the content management module 108 can assemble a content package by requesting the data for the web page from one of the primary content providers 110 maintaining the web page. For the invitational content on the web page provided by the secondary content providers 114, the content management module 108 can request the appropriate data according to the arrangement between the primary and secondary content providers 110 and 114. Additionally, the content management module 108 can create content packages that contain content from a single content provider. That is, a content package can contain only primary content or a content package can contain only secondary content. However, the content package is not limited to the content from content providers 110 and 114. Rather, the content package can include other data generated at the content delivery system 106. In some embodiments, the content delivery system 106 can preselect the content package before a request is received.

An assembled content package can include text, graphics, audio, video, executable code, or any combination thereof. Further, an assembled content package can include invitational content designed to inform or elicit a pre-defined response from the user. In some embodiments, the invitational content can be associated with a product or can directly or indirectly advertise a product. For example, the assembled content package can include one or more types of advertisements from one or more advertisers.

Additionally, the invitational content can be active invitational content. That is, invitational content that is designed to primarily elicit a pre-defined response from a user. For example, active invitational content can include one or more types of advertisements configured to be clicked upon, solicit information, or be converted by the user into a further action, such as a purchase or a download of the advertised item. However, invitational content can also be passive invitational content. That is invitational content that is designed to primarily inform the user, such as a video. In some cases, passive invitational content can include information that can lead or direct users to other invitational content including active invitational content.

Furthermore, the invitational content can be dynamic invitational content. That is invitational content that varies over time or that varies based on user interaction. For example, dynamic invitational content can include an interactive game. However, the various embodiments are not limited in this regard and the invitational content can include static invitational content that neither varies over time nor with user interaction. In the various embodiments, invitational content in a content package can be static or dynamic and active or passive. A content package can include a combination of various types of invitational content in a single content package.

In some cases, a content package can replace or update invitational content in a content package already delivered to a user terminal. For example, a first content package can include an app that can be installed on the user terminal $102_i$. A subsequent content package can include one or more items of invitational content that can be presented to a user of the user terminal $102_i$ while the user interacts with the app.

Although primary and secondary providers 110 and 114 are presented herein as separate entities, this is for illustrative purposes only. In some cases, the primary and the secondary content providers 110 and 114 can be the same entity. Thus, a single entity can provide both the primary and the secondary content.

The content management module 108 can be configured to request that content be sent directly from content providers 110 and 114. Alternatively, a cached arrangement can also be used to improve performance of the content delivery system 106 and improve overall user experience. That is, the content delivery system 106 can include a content database 112 for locally storing/caching content maintained by content providers 110 and 114. The data in the content database 112 can be refreshed or updated on a regular basis to ensure that the content in the database 112 is up to date at the time of a request from a user terminal 102*i*. However, in some cases, the content management module 108 can be configured to retrieve content directly from content providers 110 and 114 if the metadata associated with the data in the content database 112 appears to be outdated or corrupted.

As described above, content maintained by the content providers 110 and 114 can be combined according to a predefined arrangement between the two content providers, which can be embodied as a set of rules. In an arrangement where the content delivery system 106 assembles the content package from multiple content providers, the assembly rules can be stored in a rules database 116 in the content delivery system 106. The content management module 108 can be configured to assemble the content package for user terminals 102 based on these rules. The rules can specify how to select content from secondary content providers 110 and primary content providers 109 in response to a request from one of user terminals 102. For example, in the case of a web page maintained by one of primary content providers 109 and including invitational content, the rules database 116 can specify rules for selecting one of the secondary providers 110. The rules can also specify how to select specific content from the selected one of secondary providers 114 to be combined with the content provided by one of primary providers 110. In some cases, an item of primary content, such as an app or other media object, can have one or more associated attributes. For example, an app can have one or more associated genre attributes, e.g. travel, sports, education, etc. A rule can be based at least in part on the primary content attributes. Once assembled, the assembled content package can be sent to a requesting one of user terminals 102.

Additionally, rules for combining primary and secondary content can be based on user characteristics known about the user. In particular, in some cases, invitational content can be selected based on the characteristics of the requesting user (s). As used herein, the term "user characteristics" refers to the characteristics of a particular user associated with one or more of user terminals 102. User characteristics can include channel characteristics, demographic characteristics, behavioral characteristics, and spatial-temporal characteristics. Channel characteristics can define the specific delivery channel being used to deliver a content package to a user. For example, channel characteristics can include a type of electronic content, a type of device or user terminal, a carrier or network provider, or any other characteristic that defines a specific delivery channel for the content package. Spatial-temporal characteristics can define a location, a location zone, a date, a time, or any other characteristic that defines a geographic location and/or a time for delivery of the content package. Demographic characteristics can define characteristics of the users targeted by the content or associated with the content. For example, demographic characteristics can include age, income, ethnicity, gender, occupation, or any other user characteristics. Behavioral characteristics can define user behaviors for one or more different types of content, separately or in combination with any other user characteristics. That is, different behavioral characteristics may be associated with different channel, demographic, or spatial-temporal characteristics. User characteristics can also include characteristics descriptive of a user's state of mind including characteristics indicative of how likely a user is to click on or convert an item of invitational content if it were displayed to the user. User characteristics can be learned directly or derived indirectly from a variety of sources. In some embodiments, the user characteristic values can be collected from one or more databases. For example, if the user is registered with an online media service, such as the ITUNES store maintained by Apple Inc. of Cupertino, Calif., the collected data could include the user's registration information. Such data can provide values for declared user characteristics. Furthermore, the content delivery system 106 can be configured to learn of or derive user characteristics from any number of other information sources. For example, in some configurations, the content delivery system 106 can derive or infer one or more user characteristic values from user characteristic values already known about the user.

In some embodiments, the interactive content can be associated with one or more targeted segments. A targeted segment can be viewed as defining a space or region in k-dimensional space, where each of the k dimensions is associated with one of a plurality of user characteristics. In the various embodiments, the k dimensions can include both orthogonal and non-orthogonal dimensions. That is, some of the k dimensions can overlap or can be related in some aspect.

In the various embodiments, the content delivery system 106 can also include a unique user identifier (UUID) database 115 that can be used for managing sessions with the various user terminal devices 102. The UUID database 115 can be used with a variety of session management techniques. For example, the content delivery system 106 can implement an HTTP cookie or any other conventional session management method (e.g., IP address tracking, URL query strings, hidden form fields, window name tracking, authentication methods, and local shared objects) for user terminals 102 connected to content delivery system 106 via a substantially persistent network session. However, other methods can be used as well. For example, in the case of handheld communications devices, e.g. mobile phones, smart phones, tablets, or other types of user terminals connecting using multiple or non-persistent network sessions, multiple requests for content from such devices may be assigned to a same entry in the UUID database 115. The content delivery system 106 can analyze the attributes of requesting devices to determine whether such requests can be attributed to the same device. Such attributes can include device or group-specific attributes.

In some embodiments, the content delivery system 106 can include a user-profile database 120. The user-profile database 120 can, at least in part, be constructed based on declared user characteristics related to one or more users. In some cases, the user-profile database may contain inferred or derived user characteristic values. The user-profile database 120 can be updated using a user-profile-updater module 118. In some embodiments, the user-profile-updater module 118 can be configured to add additional profile data, update profile data, fill in missing profile data, or infer user characteristic values from declared data.

The user-profile-updater module 118 can also be configured to maintain the user-profile database 120 to include only more recently acquired data or to re-derive any inferred characteristics in order to ensure that the user profile is an accurate reflection of the current state of the user (location, state of mind, behaviors, demographics, etc. can change rapidly). For example, the user-profile-updater module 118 can be configured to maintain the user-profile database 120 to include only data from the last two to three months. However, the user-profile-updater module 118 can be configured to adjust the data in the user-profile database 120 to cover any span of time. In some instances the user-profile-updater module 118 can update the profile database 120 in real-time. Alternatively, the user-profile-updater module 118 can be configured to set an expiration period on a subset of the data in the user-profile database 120. For example, a policy can specify that user declared data is maintained as long as the user account is active, but user characteristic values based on location information expire after a specified period of time. In some cases, a user can set the expiration period. In some instances, the user-profile-updater module 118 can update the user-profile database 120 at least every week, or every day. In some cases, the content delivery system 106 can receive a direct request to update one or more user profiles. The update request can come directly from the user's device or any other device capable of communicating with the content delivery system 106, such as other content delivery networks or websites. In some cases, the content delivery system 106 can receive an indirect request to update one or more user profiles. An indirect request can be the result of receiving new user characteristic values. An update request can occur at any time.

In some embodiments, the content delivery system 106 can include a segment database 124 that is used to aid in selecting invitational content to target to users. The segment database 124 can store defined segments and associations between the segments and users and/or invitational content that should be targeted to users associated with the segments. As described above, a targeted segment can be defined based on one or more user characteristics or derivatives thereof and can be associated with one or more items of invitational content. Additionally, a targeted segment can be associated with one or more users. In some embodiments, by associating a targeted segment with both a user and an item of invitational content, the delivery system can match invitational content with users. In some embodiments, the content delivery system 106 can update the segment database 124 to add newly defined targeted segments or to delete targeted segments.

In some cases a targeted segment can be as simple as a single user characteristic identifier and a single user characteristic value. For example, the common demographic identifiers of gender, age, occupation, or income can each be used in defining corresponding targeted segments. A characteristic value can also be assigned to the identifier. For example, the values of male, 19, and student can be assigned to the user characteristics of gender, age, and occupation, respectively. However, more complex targeted segments can also be defined that consist of one or more identifiers with one or more values associated with each identifier. For example, a targeted segment can be defined to target a user with the following characteristics: gender, male; age, 19-24; location, Northern California or New York City. Furthermore, targeted segments can correspond to one or more segments that content providers are likely to easily understand and thus can quickly identify as being relevant to their content. Additionally, in some embodiments, content providers 110 and 114 can define a custom targeted segment.

In some embodiments, the content delivery system 106 can provide a segment assigner module 130. The segment assigner module 130 can apply a set of user characteristics associated with a user (including segments to which a user has been previously assigned) to assign the user to one or more targeted segments. The assigner module 130 can obtain the set of user characteristic values from the user-profile database 120 and/or from the user's activities during the current session. The segment assigner module 130 can assign a user to one or more defined targeted segments in the segment database 124, or alternatively, a user can be assigned to a custom targeted segment defined to meet specific goals of a content provider.

Based on the assigned segments, the user-profile database 120 can be updated to reflect the segment assignments. Additionally, the content delivery system 106 can use the segment assignments to select targeted content. In some cases, the user profile data in the user-profile database 120 can change over time so the segment assigner module 130 can be configured to periodically update the segment assignments in the user-profile database 120. The segment assignment update can be triggered at specified intervals, upon detection of a change in the user-profile database 120, and/or upon detection of a specified activity in the content delivery system 106.

In some embodiments, the content delivery system 106 can provide a prioritizer module 128. The prioritizer module 128 can perform a variety of prioritizing tasks based on the configuration of the content delivery system 106. In some configurations, the prioritizer module 128 can prioritize the targeted segments assigned to a user. The prioritization can be influenced by a number of factors, which can include the user's context, a content provider's campaign goals, and/or the content that is currently available for display to the user. A request to prioritize the targeted segments can be explicit or implicit and can be made by any component of the system 100. For example, a secondary content provider 114 can explicitly request that the content delivery system 106 prioritize the targeted segments or the request can be implicit as part of a request for a content package. The resulting prioritized list can be provided, for example, to the content management module 108, which can then use the information to assemble and deliver a content package. Additionally, the prioritized list can be stored, for example in the user profile, for later use.

While the content delivery system 106 is presented with specific components, it should be understood by one skilled in the art, that the architectural configuration of system 106 is simply one possible configuration and that other configurations with more or less components are also possible.

One aspect of the present technology is the gathering and use of data available from various sources to improve the delivery to users of invitational content or any other content that may be of interest to them. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, or any other identifying information.

The present disclosure recognizes that the use of such personal information data, in the present technology, can be used to the benefit of users. For example, the personal information data can be used to deliver targeted content that is of greater interest to the user. Accordingly, use of such personal information data enables calculated control of the delivered content. Further, other uses for personal information data that benefit the user are also contemplated by the present disclosure.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services. In another example, users can select not to provide location information for targeted content delivery services. In yet another example, users can select to not provide precise location information, but permit the transfer of location zone information.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publically available information.

To implement the various embodiments of the present technology, the content delivery system 106 can include additional components. As noted above, one aspect of the present technology is to detect events on a client device and use that information to valuate slots for delivering advertising to the client device. To this end, the content management system 106 can further include an event monitor 126, an event database 117, and a pricing engine 122.

The event monitor 126 works in conjunction with the communications interface 107 to communicate with the user terminals 102 over the network 104. In particular, the event monitor 126 will request or receive data from the user terminals 102 regarding the events taking place on the user terminals 102. The events can be reported by the device $102_i$ or by way of an application that is running on the device $102_i$. In some configuration, the events can be reported as they occur in real-time. Alternatively, the events can be maintained in an activity log that is saved on the device $102_i$. This activity log or the contents therein can be reported periodically, at pre-defined times, in response to pre-defined events or conditions, or it can be reported upon receiving a request from the event monitor 126 for event information.

The event monitor 126 can then process or parse the event data and store it on the event database 117. The event database 117 can maintain the records of the different user events detected on the user terminals 102. Examples of items that these records can include are: the type of event, the time of the event, and the application used (if any) during the event. The pricing engine 122 can then access the information stored on the event database 117 and perform the necessary steps to obtain a cost of a slot for an invitational content item to be delivered to user terminal $102_i$.

Now that some basic concepts have been set forth, the present disclosure turns to a more detailed description of the present technology. As discussed above, the present technology is directed to systems and methods to valuate slots for the delivery of invitational content based on events detected on the client device. The following figures provide exemplary systems and methods for practicing the present technology.

Figure 2:
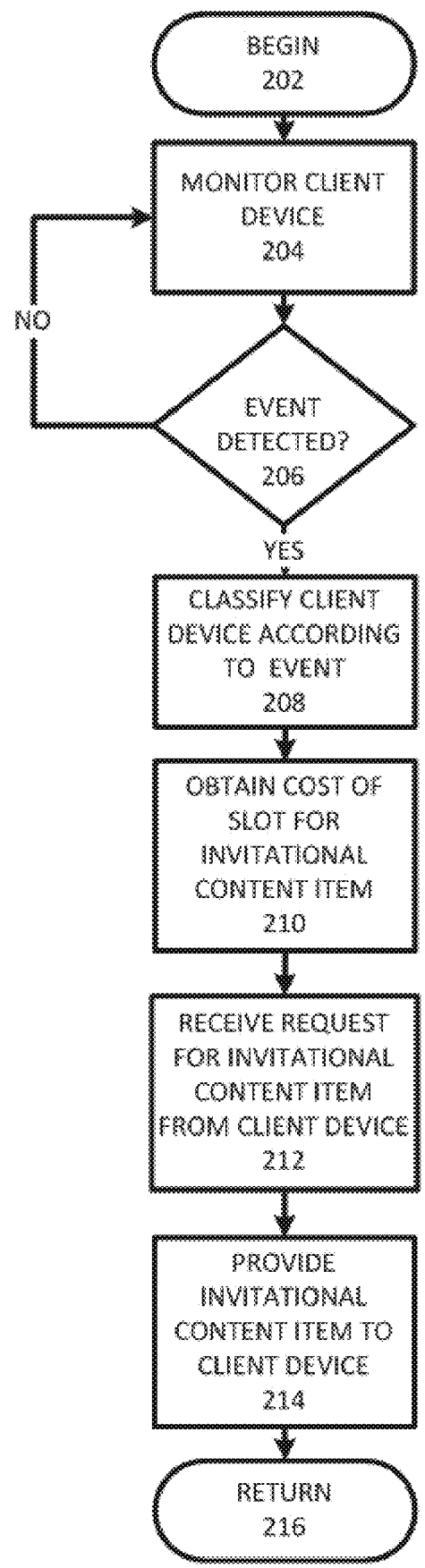
FIG. 2 illustrates an exemplary method embodiment.

Turning now to FIG. 2, an operation of the slot valuation process will be discussed in greater detail. FIG. 2 is a flowchart of steps in an exemplary method 200 for valuing an invitational content slot based on an event. Method 200 begins at step 202 and continues to step 204. At step 204, the content delivery system, an example of which is an advertising server ("ad server"), commences monitoring the client device for any number of events.

An event can include a user interaction with the client device. A user interaction can be further defined to include affirmative acts by the user as well as passive acts or the absence of an affirmative act. In one example, the ad server observes that the client device has launched a music playing application, such as ITUNES RADIO maintained by Apple Inc. of Cupertino, Calif. Launching such an application would qualify as an event because this is a user interaction. Furthermore, as the device user utilizes the music playing application on the client device, the ad server can take notice of events such as changing the radio station, skipping a song, purchasing a song, rating a song, rating an artist, creating playlists, sharing radio stations, and creating new radio stations. All of these actions are defined as events. Additional examples of events include user interactions with features that allow a user to customize a particular radio station by selecting options such as "Never Play This" or "Play More Like This." The server can also monitor for events on the client device to determine if the application has been paused, shut down, or if it has been minimized such that it is running in the background while the device user performs other functions with the client device.

Furthermore, as mentioned above, an event can also include a passive activity such as listening to the mobile user's favorite radio station. A favorite radio station can be explicitly defined in the application or it can be inferred based on the past usage patterns. Also, an event is defined to include listening to one of the mobile user's favorite songs. A favorite song can be explicitly defined in the application or it can be inferred based on usage patterns such as having a low "skip" rate over a number of times played. An even also includes the absence of an affirmative act by the device user when one might normally be expected. For example, if the radio station is playing a song that the device user regularly skips, the lack of a "skip" command is classified as an event.

Although the present technology is described herein generally with respect to a media player application, the present technology can also be applied to other types of applications. For example, the present technology can be used with navigation applications, such as GPS navigation applications. In GPS navigation, it is common to have a limited amount of interaction with the device. That is, after the destination is entered by the user into the GPS application, the device user need not perform any affirmative actions to maintain attentiveness to the client device. However, the client device can detect if the device user is following the directions that the application is providing and paying attention to the application. For example, the act of turning left when the application instructs that a left turn is required can be classified as an event. Likewise, disregarding the navigation instructions provided by the application can also be regarded as an event. Based on this attentiveness, slots or opportunities for invitational content can be priced accordingly.

In such configurations, the ad server can monitor the client device to detect the events in several different ways. As discussed above, the client device can maintain a localized history log of events that have occurred on the client device. This log can contain information such as the time/duration of the event, any application data associated with the event, and a description of the event. The client device can provide this information to the ad server in real-time, on a periodic basis, or upon request. Alternatively, each application that runs on the client device can be responsible for maintaining its own event log. The client device can collect the information from the applications for centralized management, or the application can report the activity to the ad server directly.

Referring back to FIG. 2, at step 206 it is determined whether or not an event was detected. If none has been detected, the method returns to step 204 and continues to monitor the client device. If an event is detected at step 206, the method 200 proceeds to step 208. At step 208, the server classifies the client device according to the particular event that was detected by step 206.

The device classification can take into account a number of different factors. For example, the classification can be an activity mode that is based on the time that has elapsed since the event. If very little time has elapsed, then the client device can be classified as having an attentive user mode. As more time passes from the event, the classification can progressively change until it is determined that the client device is being employed in a passive user mode. For example, when the device user launches an application, the device can be classified as having an attentive user mode for the next 15 minutes. After that, if no new events are detected, the device can be classified as having a passive user mode. The actual time used to classify a particular activity mode can vary among device users and among applications. For instance, a location-based or navigation application can have an extended time for the attentive user mode because it can be inferred that the device user is maintaining attentiveness for longer periods of time despite the lack of user interaction with the client device.

In addition, the activity mode is affected by patterns of known behaviors that include passive activities. For example, when a favorite song is played, the client device can be classified as having an attentive user mode for a longer period of time, despite the lack of an event detected on the device. Likewise, if a song that the device user regularly skips plays uninterrupted, the device can be classified as a passive user mode despite the detection of a recent event on the client device.

Another way that the classification of the client device can be made is by assigning different scoring factors to the event types detected by step 206 to determine a device user's present mood. For instance, prior to detecting any events, the device can be classified as having a "neutral" perceived mood. If the mobile user provides positive feedback by purchasing a song or by "liking" a song or artist, then such an event can carry a "positive" scoring factor and it can be inferred that the mobile user is presently tending towards a positive disposition and may be more receptive to invitational content and providing a conversion. Thus, slots for invitational content during these times can be considered "premium" for a limited time and a higher cost can be attributed. Alternatively, the mood can be used to extend the amount of time that would normally be attributed based on attentiveness alone. Likewise, if the mobile user expresses distaste by performing actions such as skipping a song or changing the radio station, then such events can carry a "negative" scoring factor and it can be inferred that the mobile user is presently tending towards a negative disposition. Thus, the user may not be as receptive to invitational content. Thus, in addition to using cost to control slot pricing, the mood can be used to reduce the amount of time that would normally be attributed based on attentiveness alone.

As such, the client device can be classified according to the perceived mood of the mobile user. The perceived mood classification can be quantified by assigning scoring factors to the different events. Accordingly, the present technology can combine any number of events and classify the perceived mood of the device using the scoring factors. Also, scoring factors for specific events can be weighted differently by the present technology. The scoring factors and weights can be pre-set values that can also be adjusted as the present technology gathers data from a particular device user. As noted above, this classification based on perceived mood can be used independently or in conjunction with any other classification, such as the aforementioned activity mode.

Referring back to FIG. 2, at step 210 the server determines the cost for an advertising slot on the client device based on the classification of the client device that was established in step 208. The cost of the slot is higher if the client device is classified as having an attentive user mode as opposed to a passive user mode. Likewise, the cost is higher if the classification carries with it a "positive" perceived mood as opposed to a "negative" or "neutral" perceived mood. Note that the classifications used herein are merely examples that can be assigned to a client device; in practice there are many more classifications and combinations thereof that can be used to determine the cost of the advertising slot.

Furthermore, at step 210 the server can obtain the cost for the advertising slot in a number of different ways. The cost for the advertising slot can be calculated by using a set formula that is a function of the present client device classification. The cost for the advertising slot may also be obtained by way of a lookup table or a similar query process performed by the server. Alternatively, the cost for the advertising slot can be provided to the server by a communicatively coupled device such as another server. In addition, the cost for the advertising slot can be affected by a number of other factors besides the present client device classification. The server can manage many requirements for different advertising campaigns that can impact the cost for a particular advertising slot. However, the present technology is one of the factors used to determine the cost of the advertising slot.

Returning to method 200, at step 212 the ad server receives a request for an invitational content item from the client device or from an application that is running on the client device. In response to this request, the method proceeds to step 214 wherein the server provides an advertisement to the client device at a designated time slot. The advertisement can be of the "banner" type that the device receives and places somewhere on the visual display where a user can see it. This type of ad can be displayed at any time, regardless of whether or not a song is being played. The advertisement may further contemplate a conversion feature such as a "click-back" function that will allow the device user to interact with the advertisement by selecting it through some interaction with the device. Alternatively, the advertisement can be in the form of interstitial audio or video that is presented between songs. Once the advertisement is provided to the client device, the method continues to step 216 to resume previous processing, including repeating method 200.

From the foregoing, the advantages of the present technology become apparent. By monitoring the client device for events, invitational content slots can be valued much more accurately based on the device user's level of attentiveness and current disposition. An advertiser that wants to ensure the invitational content item is delivered at a time slot when the user is most receptive can be offered such a slot at a premium. Associating the cost of particular slots with different device classifications thus allows advertisers to better plan for prospective advertising campaigns. In addition, the present technology also allows the advertising server to better manage advertising slots so as to meet the different requirements of the various ongoing advertising campaigns. In some instances, advertising campaigns are based on a number of impressions, which requires the ad server to simply deliver the invitational content item to a certain number of device users. However, other advertising campaigns carry a conversion requirement that necessitates user feedback. One example of this is an ad with a "click-back" feature; the server can use the present technology to select a time slot when it is most likely that a device user will "click" on the ad to meet the conversion requirement.

Figure 3:
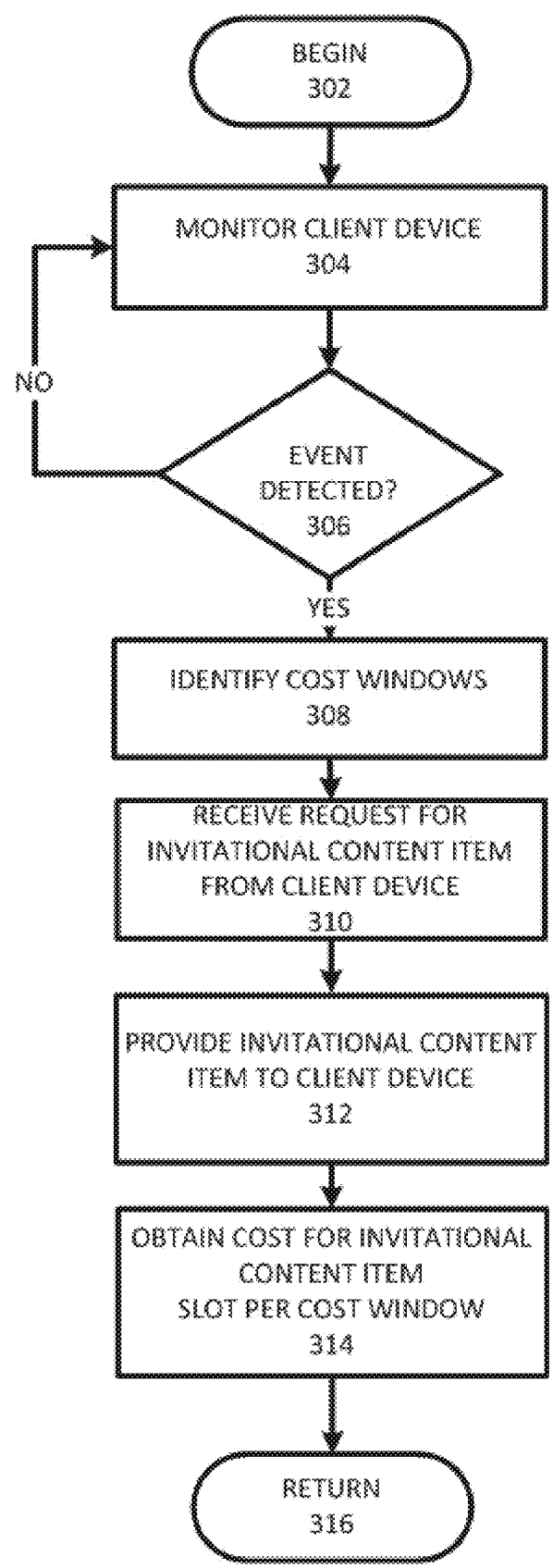
FIG. 3 illustrates an exemplary method embodiment.

Now turning to FIG. 3, another operation of the slot valuation process will be discussed in greater detail. FIG. 3 is a flowchart of steps in a second exemplary method 300 for valuing an invitational content slot based on events and on cost windows. Method 300 begins at step 302 and continues to step 304. At step 304, the server commences monitoring the client device for any number of events.

Steps 304 and 306 of method 300 are analogous to steps 204 and 206 of method 200. Additional details for these steps are included above and will not be repeated here. After an event is detected by step 306, method 300 moves on to identify the advertising slot cost windows at 308.

Figure 4A:
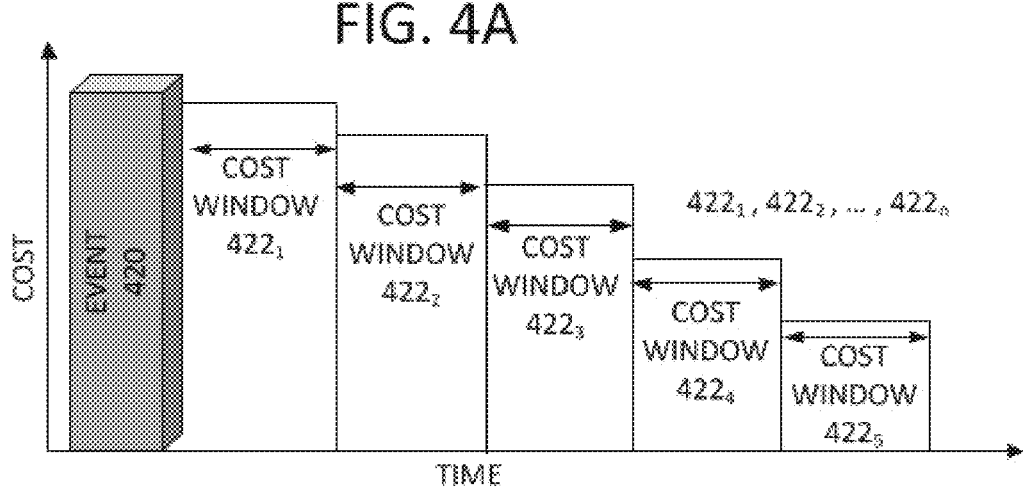
FIGS. 4A, 4B and 4C illustrate graphical representations of the various cost windows.

There are a number of different ways to define and identify cost windows. A first example is illustrated by FIG. 4A where a single event 320 is detected and the cost windows ($422_1$, $422_2$, $422_3$, $422_4$, $422_5$) are defined per the time elapsed from the event. Here, the cost for advertising slot decreases in each consecutive window. The cost of the slot in cost window $422_1$ will be greater than the cost in the slot $422_2$. The cost function is not necessarily linear as there can be small or large variations in cost from one window to the next. FIG. 4A contains five cost windows for illustrative purposes, but the number of identified cost windows can range from as little as two to as many as necessary.

Figure 4B:
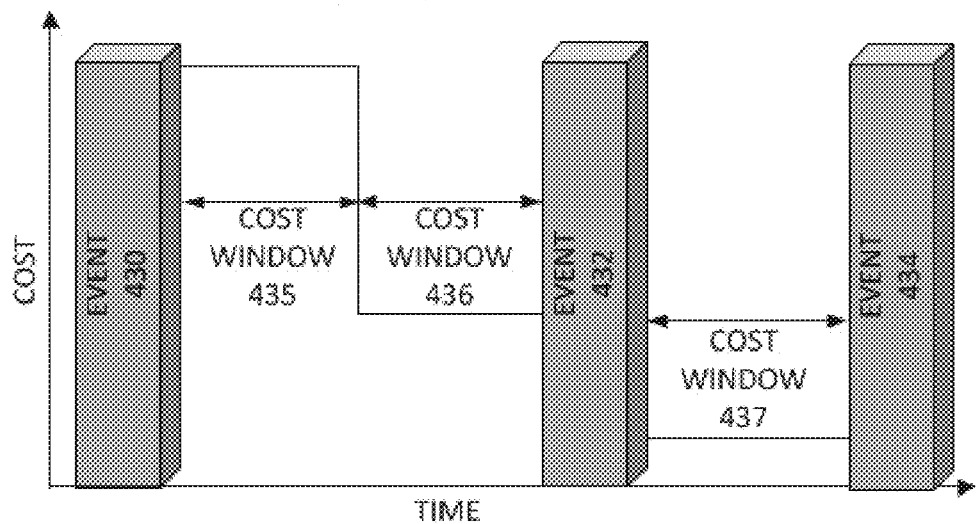

Another example for identifying cost windows is illustrated by FIG. 4B. Here there is a fixed cost for the slot in cost window 435 that follows event 430. That cost is constant for a set amount of time after which the cost reverts to a baseline amount according to cost window 436. For example, event 430 can be when the device user tunes the radio application to the device user's favorite station. At this point, the server can use the present technology to assign cost window 435 to have a premium slot cost and to last for a certain number of minutes because the device user is engaged with the application. Once the defined time expires, the cost can revert to a baseline amount until a next event 432 is detected. Event 432 is an example of a type of event that can result in lowering the cost for a slot in the subsequent cost window 437. An example of such an event can be when a song or an artist that the device user is known to dislike is played and the device user does not engage the skip function, allowing it to play uninterrupted. Here the server can conclude that the device user is not presently engaged therefore devaluing the subsequent cost window until another event 434 is detected.

Figure 4C:
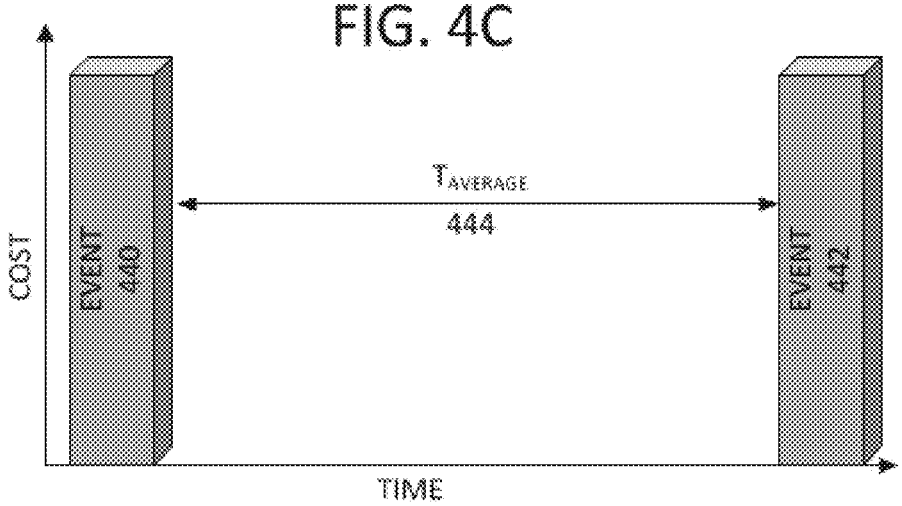

FIG. 4C illustrates yet another embodiment of a method to define a cost window. Here, the server will monitor the device user's pattern of usage over time to determine, on average, how frequently the particular device user tends to have events. Once the average time 444 is determined for a particular device user, the cost window will be defined according to that time. For example, if it is observed that a particular device user tends to interact with the music playing application every 12 minutes, then the first cost window will be defined to last for 12 minutes. After that time has elapsed, slots will fall into a second cost window until another event is detected.

Returning to method 300 of FIG. 3, after the cost windows are identified by step 308, the method proceeds to step 310 where it receives a request for an invitational content item from the client device. In response to this request, the server provides an invitational content item to the client device in step 312. As previously discussed, the invitational content item can be of the "banner" type or it can be interstitial audio or interstitial video or any combination of these.

Once the invitational content item is provided at step 312, the method will proceed to step 314 to obtain the cost of the time slot for the invitational content item. The cost of the time slot will correspond to the cost window in which the invitational content item was provided to the client device. The present technology will allow continued usage of the identified cost windows for obtaining the cost of subsequent slots by extending the cost windows indefinitely if no new events are detected. Once the cost of the slot is obtained, the method continues to step 316 to continue previous processing, including repeating method 300.

Figure 5:
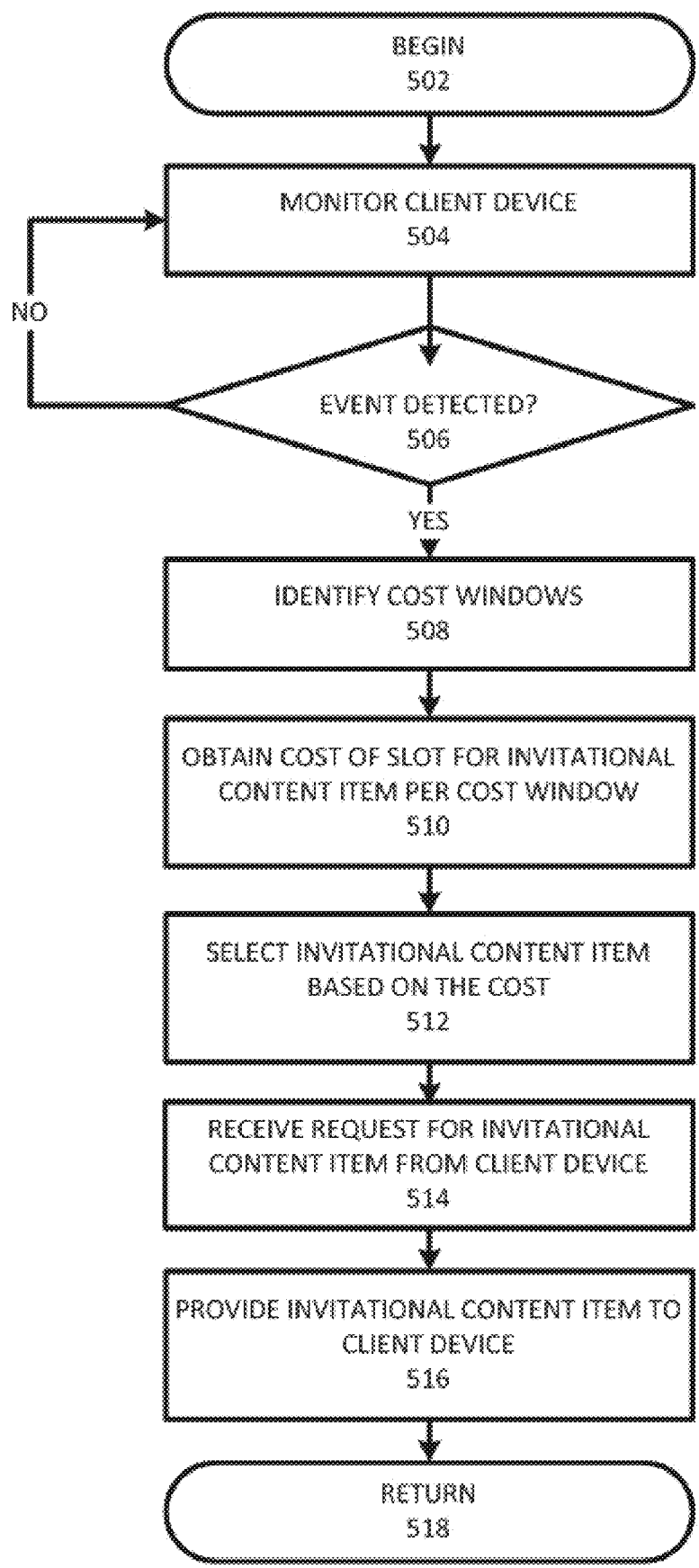
FIG. 5 illustrates an exemplary method embodiment.

Now turning to FIG. 5, another operation of the slot valuation process will be discussed in greater detail. FIG. 5 is a flowchart of steps in a third exemplary method 500 for selecting an invitational content slot based on detected events and on cost windows. Method 500 begins at step 502 and continues to step 504. At step 504, the server commences monitoring the client device for any number of events.

Steps 504, 506, and 508 of method 500 are analogous to steps 404, 406, and 408 of method 400 in FIG. 4. Additional details for these steps are included above and will not be repeated here. After the cost windows are identified by step 508, method 400 moves on to obtain the cost of time slots for an invitational content item at 510.

Step 510 obtains the cost of one or more time slots based on the identified cost windows from step 508. Again, this step is analogous to step 412 in FIG. 4. Thereafter at step 512, the method selects an invitational content item for the particular slot based on the cost obtained at 510. This step allows for a greater level of control for the ad server to manage one or more ad campaigns. For example, the ad server can better handle budget constraints of ad campaigns by selectively dispatching ads with a lower budgeted campaign during the time slots that correspond to low cost windows. Likewise, if a particular ad campaign is nearing its impression count requirement but still has an ample budget, the ad server can attempt to exhaust the remaining budget through a lower number of impressions that are dispatched during the premium valued cost windows.

Once the selection of the appropriate invitational content item is made, the method proceeds to 514 where the ad server receives a request for an invitational content item from the client device. At 516, the method provides the item that was previously selected in step 512 to the client device. The method then continues to step 518 where it returns to previous processing, including repeating method 500.

Now turning to FIG. 6, another operation of the slot valuation process is illustrated by method 600. The method begins at step 602 and proceeds to monitor the client device at 604. The monitoring performed by step 604 and the detection of the user interaction 606 is analogous to similar steps in the previous method embodiments and will not be discussed further.

After an event is detected at 606 the method continues to 608 where the time of the event is recorded. The method continues to step 610 in which the ad server receives a request for an item of invitational content from the client device. At 612, the ad server responds to the requests by providing an item to the client device. The server can either make a selection upon receiving the request or push an ad from a previously established queue.

At step 614 the method determines the amount of time that has elapsed from the event time 608 to the slot where the invitational content item was provided 612. Upon determining the elapsed time, the method obtains a cost of the particular time slot at 616 based on the elapsed time.

One example of method 600 would be a device user purchasing or requesting a song via the ITUNES STORE. This event would be detected by step 606 and the time of the event would be recorded according to step 608. Next, the radio application can send a request to the server 610 for an invitational content item that is to be played when the song playback concludes. In response, the server can send an interstitial audio advertisement 612 that is played immediately after the application completes playback of the purchased song. The method would then calculate the amount of time that elapsed 614 from when the user purchased the song to when the interstitial audio advertisement was delivered to the user device. Based on this elapsed time, the cost of the slot for the interstitial audio advertisement would be obtained 616, either by way of calculation or through another method such as a lookup table. In this example, the cost for the particular slot will be valued at a premium rate because a minimal amount of time elapsed from the user interaction which means that the device user was most attentive. Furthermore, the event (purchasing a song) was one in which it was very likely that the device user would maintain attentiveness and would be likely to have a positive disposition.

Turning back to method 600, after the method obtains the cost of the slot for the invitational content item at 616, it continues to 618 wherein it resumes previous processing, including repeating method 600.

Figure 7A:
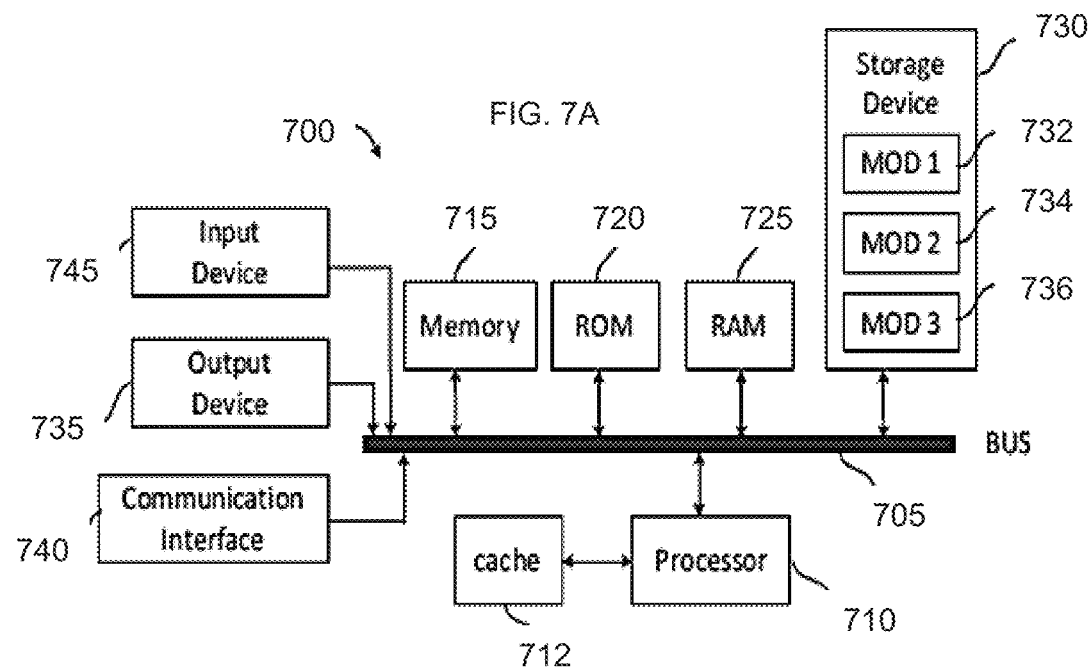
FIG. 7A and FIG. 7B illustrate exemplary system embodiments.

FIG. 7A illustrates a conventional system bus computing system architecture 700 wherein the components of the system are in electrical communication with each other using a bus 705. Exemplary system 700 includes a processing unit (CPU or processor) 710 and a system bus 705 that couples various system components including the system memory 715, such as read only memory (ROM) 720 and random access memory (RAM) 725, to the processor 710. The system 700 can include a cache of high-speed memory connected directly with, in close proximity to, or integrated as part of the processor 710. The system 600 can copy data from the memory 715 and/or the storage device 730 to the cache 712 for quick access by the processor 710. In this way, the cache can provide a performance boost that avoids processor 710 delays while waiting for data. These and other modules can control or be configured to control the processor 710 to perform various actions. Other system memory 715 may be available for use as well. The memory 715 can include multiple different types of memory with different performance characteristics. The processor 710 can include any general purpose processor and a hardware module or software module, such as module 1 732, module 2 734, and module 3 736 stored in storage device 730, configured to control the processor 710 as well as a special-purpose processor where software instructions are incorporated into the actual processor design. The processor 710 may essentially be a completely self-contained computing system, containing multiple cores or processors, a bus, memory controller, cache, etc. A multi-core processor may be symmetric or asymmetric.

To enable user interaction with the computing device 700, an input device 745 can represent any number of input mechanisms, such as a microphone for speech, a touch-sensitive screen for gesture or graphical input, keyboard, mouse, motion input, speech and so forth. An output device 735 can also be one or more of a number of output mechanisms known to those of skill in the art. In some instances, multimodal systems can enable a user to provide multiple types of input to communicate with the computing device 700. The communications interface 740 can generally govern and manage the user input and system output. There is no restriction on operating on any particular hardware arrangement and therefore the basic features here may easily be substituted for improved hardware or firmware arrangements as they are developed.

Storage device 730 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 725, read only memory (ROM) 720, and hybrids thereof.

The storage device 730 can include software modules 732, 734, 736 for controlling the processor 710. Other hardware or software modules are contemplated. The storage device 730 can be connected to the system bus 705. In one aspect, a hardware module that performs a particular function can include the software component stored in a computer-readable medium in connection with the necessary hardware components, such as the processor 710, bus 705, display 735, and so forth, to carry out the function.

Figure 7B:
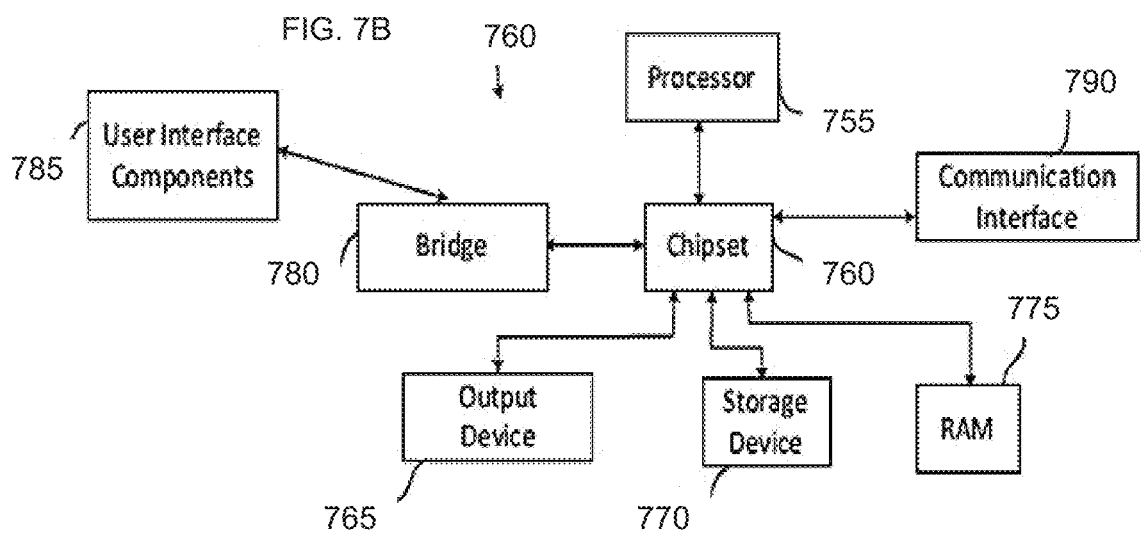

FIG. 7B illustrates a computer system 750 having a chipset architecture that can be used in executing the described method and generating and displaying a graphical user interface (GUI). Computer system 750 is an example of computer hardware, software, and firmware that can be used to implement the disclosed technology. System 750 can include a processor 755, representative of any number of physically and/or logically distinct resources capable of executing software, firmware, and hardware configured to perform identified computations. Processor 755 can communicate with a chipset 660 that can control input to and output from processor 755. In this example, chipset 760 outputs information to output 765, such as a display, and can read and write information to storage device 770, which can include magnetic media, and solid state media, for example. Chipset 760 can also read data from and write data to RAM 775. A bridge 780 for interfacing with a variety of user interface components 785 can be provided for interfacing with chipset 760. Such user interface components 785 can include a keyboard, a microphone, touch detection and processing circuitry, a pointing device, such as a mouse, and so on. In general, inputs to system 750 can come from any of a variety of sources, machine generated and/or human generated.

Chipset 760 can also interface with one or more communication interfaces 790 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 755 analyzing data stored in storage 770 or 775. Further, the machine can receive inputs from a user via user interface components 785 and execute appropriate functions, such as browsing functions by interpreting these inputs using processor 755.

It can be appreciated that exemplary systems 700 and 750 can have more than one processor 710 or be part of a group or cluster of computing devices networked together to provide greater processing capability.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims. Claim language reciting "at least one of" a set indicates that one member of the set or multiple members of the set satisfy the claim. Tangible computer-readable storage media, computer-readable storage devices, or computer-readable memory devices, expressly exclude media such as transitory waves, energy, carrier signals, electromagnetic waves, and signals per se.

We claim:

1. A computer-implemented method comprising:
    detecting one or more events on a client device having an open slot for one or more content items, wherein a first event comprises a first user interaction with the client device after a presentation of a first content item at the client device;
    determining a type of interaction of the first user interaction with the client device;
    determining a user interest in the first content item based on one or more user interactions with the first content item at the client device;
    determining a cost of the open slot for one or more content items based on the type of interaction of the first user interaction with the client device, the user interest in the first content item, and a cost window comprising a variable time period that starts after the first user interaction and runs during the presentation of the first content item until a second user interaction is detected on the client device, wherein the cost of the open slot decreases as time elapsed between the first user interaction and the second user interaction increases; and
    providing a second content item to the client device for the open slot based on the cost.

2. The method of claim 1, wherein determining the user interest comprises determining, based on user activity, one of a positive indication of interest or a negative indication of interest.

3. The method of claim 2, wherein the cost decreases when:
the user interest comprises the negative indication of interest; and
the time period associated with the cost window exceeds a threshold amount of time.

4. The method of claim 2, wherein the cost increases when:
the user interest comprises the positive indication of interest; and
the time period associated with the cost window is below a threshold amount of time.

5. The method of claim 1, further comprising:
determining a second cost of a second open slot at the client device based on an average amount of time between a plurality of user interactions detected during a presentation of content at the client device; and
providing a third content item to the client device for the second open slot based on the second cost.

6. The method of claim 1, wherein the one or more events comprises at least one event associated with a music playing application on the client device, wherein the presentation of the first content item is associated with a playback of the music playing application, and wherein the first user interaction comprises a user input via the music playing application during the playback of the music playing application.

7. A computer implemented method comprising:
detecting a first user interaction with a client device that has an open slot for content items, the first user interaction being associated with a presentation of content at the client device;
identifying a plurality of cost windows for the open slot based on the first user interaction, the plurality of cost windows comprising a first cost window comprising a fixed period of time after the first user interaction and a second cost window comprising a variable period of time that starts after the fixed period of time and continues until a second user interaction is detected at the client device, wherein a respective cost of the second cost window decreases as an amount of time elapsed between an end of the fixed period of time and the second user interaction increases, and wherein the first cost window associated with the fixed period of time has a higher cost than the respective cost of the second cost window associated with the additional period of time;
detecting the second user interaction at the client device, the second user interaction being after the fixed period of time;
providing a content item to the client device for the open slot, the content item being provided at one of the first cost window or the second cost window; and
obtaining a particular cost of the open slot for the content item, wherein the particular cost is based on whether the content item is provided at the first cost window or the second cost window, the particular cost comprising the second cost when the content item is provided at the first cost window and the first cost when the content item is provided at the second cost window.

8. The method of claim 7, wherein the variable period of time is triggered upon expiration of the fixed period of time and terminates when the second user interaction is detected after the fixed period of time, wherein the first user interaction comprises skipping a song in a music application, and wherein the fixed period of time begins after the skipping of the song in the music application.

9. The method of claim 7, wherein the fixed period of time is based on an average period of time between events detected over a predetermined period of time.

10. The method of claim 7, wherein the first user interaction comprises a user interaction with a music application on the client device during a playback of music content via the music application.

11. The method of claim 7, wherein the first user interaction comprises launching of an application at the client device, wherein the first cost window comprises the fixed period of time after the launching of the application at the client device, and wherein the second cost window comprises the variable period of time that starts after the fixed period of time and continues until the second user interaction with the application launched at the client device.

12. The method of claim 11, wherein the first user interaction comprises interacting with a media item during playback of the media item in the media application, wherein the first cost window comprises the fixed period of time after interacting with the media item during playback of the media item.

13. A system, comprising:
one or more processors; and
at least one computer readable medium having stored thereon instructions which, when executed by the one or more processors, cause the system to:
detect a first user interaction with client device that has an open slot for content items, the first user interaction being associated with a presentation of content at system;
identify a plurality of cost windows for the open slot based on the first user interaction, the plurality of cost windows comprising a first cost window comprising a fixed period of time after the first user interaction and a second cost window comprising a variable period of time that starts after the fixed period of time and continues until a second user interaction at the client device, wherein a respective cost of the second cost window decreases as an amount of time elapsed between an end of the fixed period of time and the second user interaction increases, and wherein the first cost window associated with the fixed period of time has a higher cost than the respective cost of the second cost window associated with the variable period of time;
detect the second user interaction at the client device, the second user interaction being after the fixed period of time;
obtain a particular cost of the open slot for a content item based on the first cost window and the second cost window, wherein the particular cost is based on whether the content item is provided at the first cost window or the second cost window, the particular cost comprising the second cost when the content item is provided at the first cost window and the first cost when the content item is provided at the second cost window;
select the content item for the open slot based on the particular cost; and
provide the content item to the client device for the open slot at one of the first cost window or the second cost window associated with the particular cost.

14. The system of claim 13, wherein the additional period of time is triggered upon expiration of the fixed period of time and ends when the second user interaction is detected after the fixed period of time, wherein the first user interaction comprises skipping a song in a music application, and wherein the fixed period of time begins after the skipping of the song in the music application.

15. The system of claim 13, wherein the fixed period of time is based on an average period of time between events detected over a predetermined period of time.

16. The system of claim 13, wherein the first user interaction comprises a user interaction with a music application during a playback of music content via the music application.

17. The system of claim 13, wherein the first user interaction comprises launching an application at the client device.

18. The system of claim 13, wherein the first user interaction comprises rating a song in a music application, wherein the fixed period of time beings after the rating of the song in the music application.

19. A system comprising:
one or more processors; and
at least one computer-readable storage medium storing instructions which, when executed by the one or more processors, cause the system to perform operations comprising:
detecting one or more on a client device that has an open slot for content, wherein a first event comprises a first user interaction with the client device after a presentation of a first content item at the client device;
determining a type of interaction of the first user interaction with the client device;
determining a user interest in the first content item based on one or more user interactions with the first content item at the client device;
determining a cost of the open slot for one or more content items based on the type of interaction of the first user interaction with the client device, a cost window comprising a variable time period that starts after the first user interaction and runs during the presentation of the first content item until a second user interaction is detected on the client device, and the user interest in the first content item, wherein the cost of the open slot decreases as time elapsed between the first user interaction and the second user interaction increases; and
providing a second content item to the client device for the open slot based on the cost of the open slot.

20. The system of claim 19, wherein determining the user interest comprises determining a mood classification for the client device, wherein the mood classification comprises at least a positive mood and a negative mood.

21. The system of claim 20, wherein the positive mood causes an increase in the cost for the open slot.

22. A non-transitory computer-readable storage medium comprising:
instructions stored therein which, when executed by one or more processors, cause the one or more processors to:
detect one or more on a client device with an open slot for content, wherein a first event comprises a first user interaction with the client device after a presentation of a first content item at the client device;
determine a type of interaction of the first user interaction with the client device;
determine a user interest in the first content item based on one or more user interactions with the first content item at the client device;
determine a cost of the open slot for one or more content items based on the type of interaction of the first user interaction with the client device, a cost window comprising a variable time period that starts after the first user interaction and runs during the presentation of the first content item until a second user interaction is detected on the client device, and the user interest in the first content item, wherein the cost of the open slot decreases as time elapsed between the first user interaction and the second user interaction increases; and
provide a second content item to the client device for the open slot based on the cost.

23. The non-transitory computer-readable storage medium of claim 22, wherein determining the user interest comprises determining, based on user activity, one of a positive indication of interest or a negative indication of interest.

24. The non-transitory computer-readable storage medium of claim 23, wherein the cost decreases when:
the user interest comprises the negative indication of interest; and
the time period associated with the cost window exceeds a threshold amount of time.

25. The non-transitory computer-readable storage medium of claim 23, wherein the type of interaction of the first user interaction with the client device comprises a user input on the client device during the presentation of the first content item, and wherein the first user interaction comprises an interaction with a playback of a music playing application on the client device.

* * * * *